(12) United States Patent
Nilsen et al.

(10) Patent No.: US 7,520,985 B2
(45) Date of Patent: Apr. 21, 2009

(54) DEVICE FOR COALESCING A FLUID

(75) Inventors: Pål Jahre Nilsen, Boedalen (NO); Gorm Sande, Nesbru (NO); Wojciech Piasecki, Krakow (PL)

(73) Assignee: Aibel AS, Billingstad (NO)

( * ) Notice: Subject to any disclaimer, the term of this patent is extended or adjusted under 35 U.S.C. 154(b) by 273 days.

(21) Appl. No.: 10/476,545

(22) PCT Filed: Apr. 30, 2002

(86) PCT No.: PCT/IB02/01470

§ 371 (c)(1),
(2), (4) Date: Nov. 3, 2003

(87) PCT Pub. No.: WO02/089947

PCT Pub. Date: Nov. 14, 2002

(65) Prior Publication Data

US 2004/0144640 A1    Jul. 29, 2004

(30) Foreign Application Priority Data

May 4, 2001    (NO) .................................. 20012238

(51) Int. Cl.
| | |
|---|---|
| F02M 37/22 | (2006.01) |
| B01D 17/06 | (2006.01) |
| C10G 32/02 | (2006.01) |
| C10G 33/02 | (2006.01) |
| C02F 1/40 | (2006.01) |
| B03C 5/00 | (2006.01) |

(52) U.S. Cl. ........................ 210/243; 210/748; 204/563; 204/660; 204/671

(58) Field of Classification Search ......... 204/660–674, 204/268, 272, 563–570; 210/243, 748
See application file for complete search history.

(56) References Cited

U.S. PATENT DOCUMENTS

| | | | |
|---|---|---|---|
| 3,766,050 A | | 10/1973 | Pados |
| 4,224,124 A | * | 9/1980 | Pope ........................... 204/563 |
| 5,385,658 A | | 1/1995 | Scott |
| 6,136,174 A | | 10/2000 | Berry et al. |
| 2003/0155310 A1 | | 8/2003 | Nilsen et al. |

FOREIGN PATENT DOCUMENTS

| | | |
|---|---|---|
| DE | 1642793 A1 | 3/1972 |
| EP | 0051463 A2 | 5/1982 |
| NO | 2000 6129 A | 1/2001 |
| NO | 20012238 A | 11/2001 |
| WO | WO 99/62611 A1 | 12/1999 |

OTHER PUBLICATIONS

O. Urdahl, T.J. Williams, A. G. Bailey and M.T. Thew; Electrostatic Destabilization of Water-in-Oil Emulsions Under Conditions of Turbulent Flow; Trans IChemF.; Mar. 1996; pp. 158-165; vol. 74, Part A; Institute of Chemical Engineers.

* cited by examiner

*Primary Examiner*—Harry D. Wilkins, III
*Assistant Examiner*—Nicholas A. Smith
(74) *Attorney, Agent, or Firm*—Venable LLP; Eric J. Franklin

(57) ABSTRACT

An electrically energized device for coalescing a first conductive fluid emulsified in a second fluid. A tube member has at least one fluid inlet and at least one fluid outlet. The tube member defines a flow channel for an emulsion of the first and second fluid from its inlet side to its outlet side and includes at least one electrically insulating wall portion. An interacting pair of a first and a second electrode is separated from the first and second fluid by at least one insulating wall portion of the tube member. The electrodes are supplied with a voltage for the purpose of subjecting the first and second fluid flowing through the flow channel to an electrostatic field. At least one passive center electrode is made of a conducting material and is arranged in the channel and electrically insulated from the first and second electrode.

14 Claims, 3 Drawing Sheets

DEVICE FOR COALESCING A FLUID

CROSS-REFERENCE TO RELATED APPLICATIONS

This application claims priority to Norwegian patent application 20012238 filed May 4, 2001 and is the national phase under 35 U.S.C. 517 371 of PCT/IB02/01470.

TECHNICAL FIELD

The present invention relates to an electrically energised device for coalescing a first conductive fluid, emulsified in a second fluid, comprising: a tube member, having at least one fluid inlet and at least one fluid outlet, said tube member defining a flow channel for an emulsion of the first and second fluid from its inlet side to its outlet side and comprising at least one electrically insulating wall portion, and an interacting pair of a first and a second electrode, separated from the first and second fluid by at least one insulating wall portion of the tube member and supplied with a voltage for the purpose of subjecting the first and second fluid flowing through the flow channel is to an electrostatic field.

Since the invention is particularly-applicable to electrostatic coalescer devices for promoting the coalescense of water in an emulsion comprising oil and water, it will be described with reference to such an application. However, it should be understood that it is applicable to all kinds of coalescer applications in which there is possible to affect and promote the coalescense of a first fluid in an emulsion comprising a first and a second fluid by means of an electric field applied to the emulsion.

Although the invention is applicable to all kinds of oil-treatment lines, it is particularly advantageous in off-shore applications in which a coalescer is arranged for the purpose of promoting or effectuating a pre-separation of water from oil, or a water droplet enlargement, before an extracted emulsion comprising oil and water is further conducted to a subsequent settling tank for gravitational settling of the oil. In such an application the coalescer contributes to an important reduction of the overall weight of the settling arrangement, since a reduced settling time will reduce the required tank volume.

BACKGROUND OF THE INVENTION

In the oil industry where oil is extracted from one or more wells in an oil field, oil will be extracted together with water. The water has to be removed from the oil and this is mainly done by means of settling tanks in which the oil is permitted to settle through the action of the gravitational force. However, complex oil-water emulsions may develop during the extraction of the oil. For example, the removal of gas from the oil-water emulsion by means of gas-liquid cyclones might contribute to a more complex emulsion, which will be difficult to separate only by means of settling.

As an alternative or supplement to settling treatment is electrostatic treatment of oil and water has been used by the oil industry for many years to aid in the separation of water from an oil-continuous stream. Treating a water-in-oil emulsion by passing it through a high voltage electrostatic field has been shown to promote rapid coalescence or the water droplets, leading to rapid separation.

PRIOR ART

It is well known to arrange so called electrostatic coalescers for the purpose of obtaining a destabilisation of water-in-oil emulsions, that is a water droplet enlargement or coalescense of water in the oil.

Prior art, as such suggested by WO99/62611, comprises a coalescer in which one or more centre electrodes are arranged in a tube. According to one embodiment the tube defines a grounded electrode, and the centre electrode is energised with an electric potential selected to produce the desired electrostatic field, which may be up to 15 kV.

According to another embodiment, a plurality of centre electrodes is arranged in a concentric array inside the tube. Alternate electrodes are energised with an electric power supply, while the others are connected to ground. Electrostatic fields are thereby generated between the energised and grounded electrodes.

An alternative to the solution presented in WO99/62611 is disclosed in a publication by O. Urdahi et al, entitled "Electrostatic destabilisation of water-in-oil emulsions under conditions of turbulent flow", Trans IchemE, vol 74, Part A, March 1996, p. 158-165. In this document there is disclosed an electrostatic coalescer the electrodes of which are located on opposite sides of and outside a tube that defines a flow channel with a rectangular cross section. The electrodes are parallel plates, which are insulated from the emulsion by an insulating wall of the tube of the coalescer. A number of electrode pairs are arranged in the length direction of the tube.

The applicant has further developed the coalescer as suggested by Urdahl et al. by providing a device in which the first and second electrodes are separated with a gap and extend generally in parallel in the length direction of or helically around the flow channel. Thereby an advantageously distributed electric field is obtained in the flow channel through which the treated emulsion is flowing. Preferably, the flow channel defined by the inner periphery of the tube member has a generally circular cross-section. This is an advantageous design in full-scale applications for the treatment of oil-water emulsions, and the double helical arrangement of the electrodes will result in a particularly well distributed electric field in a channel with such a cross section.

However, the main disadvantage of such a design is that a very high, enforced voltage is required if the cross-section of the tube is large.

THE OBJECT OF THE INVENTION

It is an object of the invention to present an electrically energised coalescer device that has a design that promotes the use of relatively low voltages in order to achieve the coalescing effect on the emulsion treated, even for larger cross sections of the tube.

The construction of the device shall promote an optimised distribution of an electric field over the cross-section of the emulsion flow channel. The device shall also be operatively reliable and shall promote an easy maintenance thereof. It shall not be prone to short circuits between the electrodes.

BRIEF DESCRIPTION OF THE INVENTION

The object of the invention is obtained by means of the is initially defined device, characterised in that it comprises at least one passive centre electrode, made of a conducting material, arranged in the channel and electrically insulated from the first and second electrodes. By passive is meant that the centre electrode is not connected to any voltage- or current source. The centre electrode will increase the electric field strength in the fluid but will also reduce the fluid cross section.

The at least one centre electrode is located opposite the first and second electrode, within said electrostatic field generated by the first and second electrode. This means that the electrode is arranged in the same longitudinal section of the tube member as where the electrodes are arranged.

To achieve a best possible field distribution when free water (especially if it is not in contact with the centre electrode) is present in the coalescer tube member, the centre electrode should have a floating potential, which means that it should not be connected to earth. This is particularly in those cases when the coalescer is positioned in a generally horizontal position and the first conductive fluid does not come into contact and does not electrically charge the centre electrode. Accordingly the centre electrode is electrically insulated from earth.

If the coalescer tube member is oriented generally vertically, the system will be symmetrical. Then there is no reason to have a centre electrode with floating potential. In this case the centre electrode is preferably connected to earth.

Preferably the centre electrode is elongated and generally coaxial with the channel of the tube member. The cross section of the centre electrode should be circular or elliptic.

According to one embodiment the centre electrode is coated with an electrically insulating material. A coating will reduce the tendency of the emulsion to charge the centre electrode, thereby reducing the need of connecting the electrode to earth.

The cross section of the centre electrode should be at least 10%, preferably at least 20% and most preferably at least 25% of the cross section of the channel of the tube member. If both channel and centre electrode have a circular cross section, an electrode diameter of at least 50% of the channel diameter will result in the above reduction of the fluid cross section by at least 25%, which is preferred.

According to a preferred embodiment, the channel defined by the tube member has a generally circular or elliptic cross-section, and the first and second electrode are separated with a gap and extend generally in parallel with or helically around the flow channel. Thereby an advantageously distributed electric field is obtained in the flow channel through which the treated emulsion is flowing.

Further features and advantages of the present invention are presented in the following detailed description and the further dependent claims.

BRIEF DESCRIPTION OF THE DRAWINGS

Below, preferred embodiments of the device according to the invention will be described more in detail with reference to the enclosed drawings, on which.

DETAILED DESCRIPTION OF THE INVENTION

Figure 1:
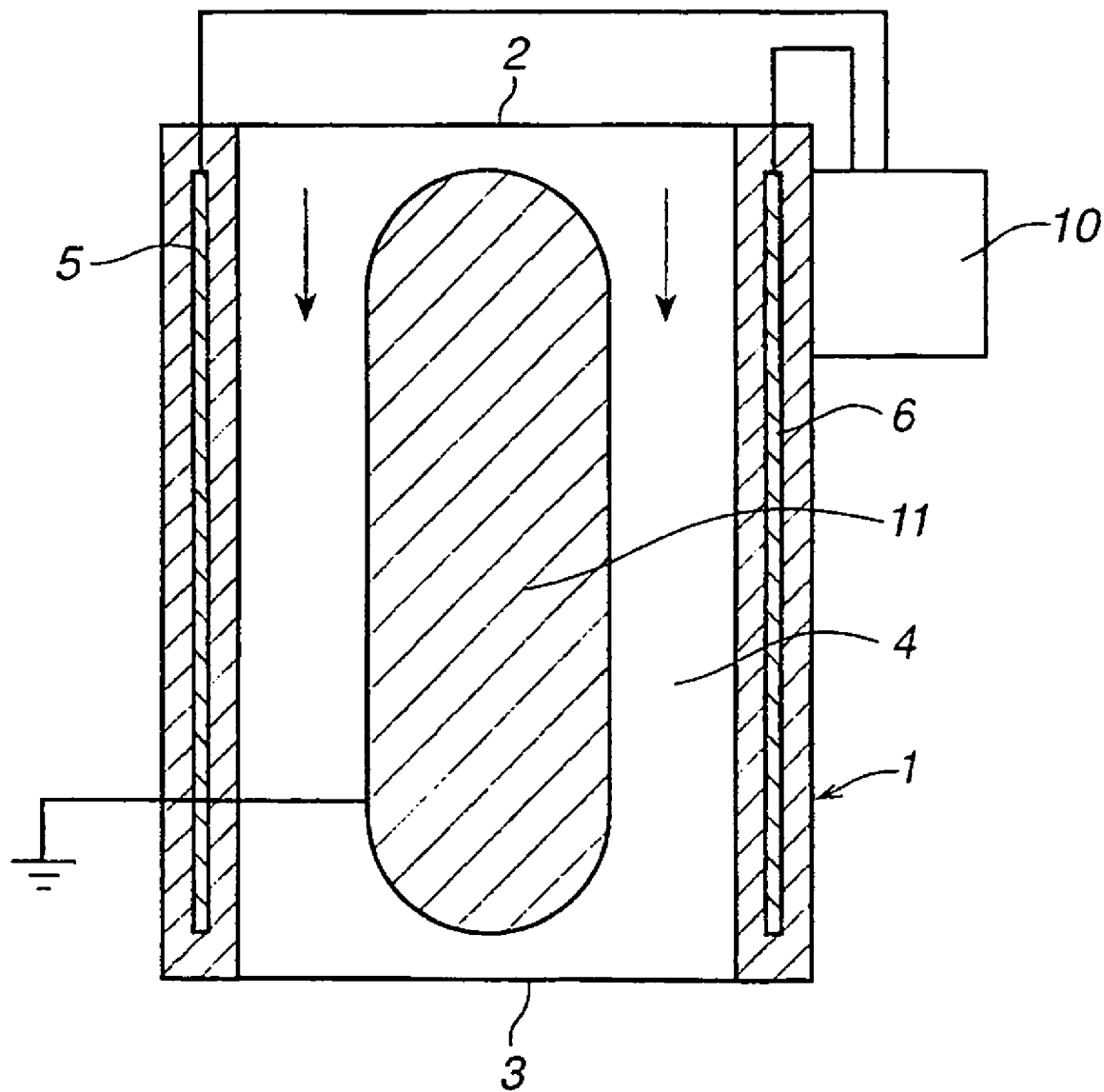
FIG. 1 is a schematic, partly cut view of an embodiment of the inventive device.

FIG. 1 is a schematic view showing a first embodiment of the coalescer device according to the invention. The coalescer comprises a tubular member 1, which defines a cylinder with an inlet 2 and an outlet 3. The tubular member 1 encloses and defines a flow channel 4 for a medium. The channel has a generally circular cross-section. Preferably, the tube member 1 is arranged in line with a pipe or conduit for conducting an emulsion comprising a first and a second fluid. The emulsion could be any one in which one of the fluids has such characteristics that a coalescense thereof can be obtained as a result of an electric field being applied to the emulsion. In a particularly preferred application the tube member is arranged in line with a pipe for conducting an extracted oil-water emulsion from a well to a settling tank. The first fluid is then water and the second fluid is oil, and the coalescense of the water is affected and promoted by means of the inventive coalescer before the emulsion reaches a subsequent settling tank (not shown).

The device comprises a first electrode 5 and a second electrode 6 attached to the tubular member 1. The electrodes 5, 6 extend along said member and are arranged peripherally outside the channel 4. The wall of the tube member 1 defines an electrically insulating portion that separates the electrodes 5, 6 from the channel 4 and thereby from immediate contact with the medium that flows through the latter.

The electrodes 5, 6 are connected to a transformer 10 via which they are electrically energised with either a pulsed voltage or an alternating voltage. In this case the required voltage will be up to 10 kV. The transformer 10 is in the shown embodiment attached to the outer periphery of the tube member 1, but can also be located at a distance from the tube member 1. The transformer is used to increase the voltage from a voltage supply source (not shown).

In the channel 4 there is arranged a centre electrode, preferably in the form of a hollow metal tube having a conductive surface made of for example a copper foil or sheet. At least the upstream end, as seen in the emulsion flow, of the metal tube is sealed. Preferably both ends are sealed. The centre electrode can also be in the form of a generally massive metal body. The centre electrode is s passive in the meaning that it is not connected to any voltage or current sources. An electric field generated in the channel 4 by the first and second electrodes 5, 6 will be affected by the centre electrode 11 and will be more concentrated in the remaining channel region between the θcentre electrode 11 and the inner periphery of the tube member 1.

Figure 2:
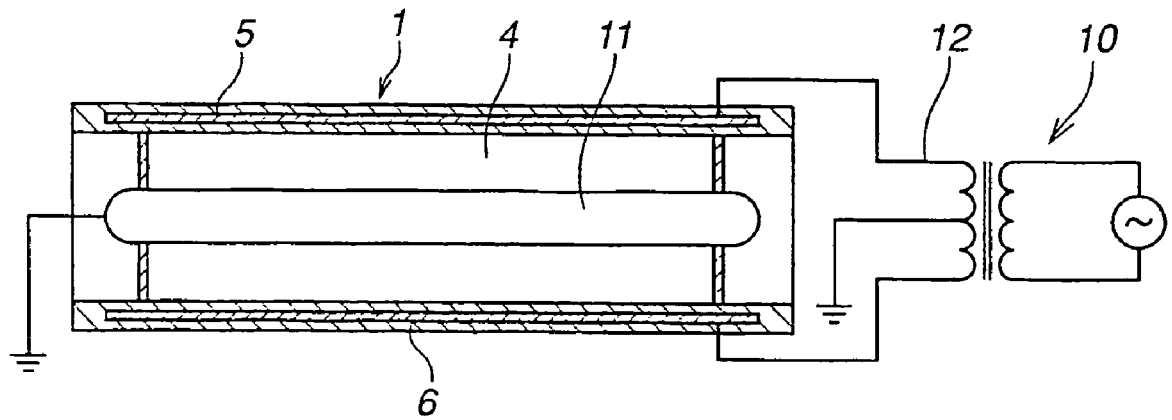
FIG. 2 is a schematic cross sectional view showing a first embodiment of the inventive device.

FIG. 2 shows an embodiment in which the centre electrode 11 is connected to earth. This is particularly the case when the coalescer is oriented generally vertically or when the level of the water continuous phase (free water) is such that it is in contact with the centre electrode 11, thereby electrically charging the latter. In order to ensure a symmetrical voltage, the centre point of the secondary winding 12 of the transformer 10 is connected to earth.

Figure 3:
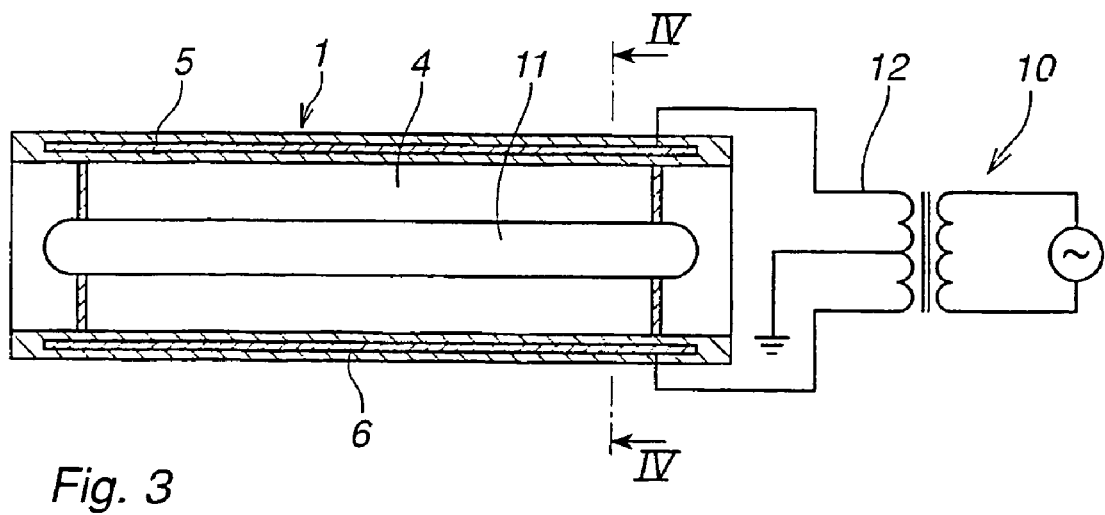
FIG. 3 is a schematic cross sectional view showing a second embodiment of the inventive device.
Figure 4:
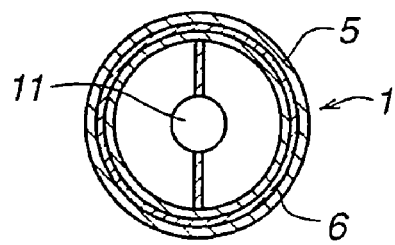
FIG. 4 is a cross-section according to IV-IV in FIG. 3.

FIG. 3 shows another embodiment in which the centre electrode 11 is not connected to earth. This embodiment is preferred when the orientation of the coalescer is not vertical and when the emulsion level is lower than a predetermined level at which the centre electrode 11 is electrically charged by the emulsion.

The centre electrode preferably has a length corresponding to the length or extension of the first and second electrodes 5, 6 in the longitudinal direction of the tube member 1. Since the emulsion is subjected to coalescence, 30 and free water in the emulsion will affect the electric field, the electric field distribution will be different in upstream and downstream parts of the coalescer. Preferably, with regard to the coalescence of the emulsion, there is a decreasing field strength in the flow direction of the emulsion. This can be obtained by using a series of individual coalescers arranged in the flow direction, the voltage supplied to any downstream coalescer being lower than for the preceding upstream coalescer. Alternatively, the arrangement of the electrodes is different for any downstream coalescer with regard to the adjacent upstream coalescer such that every downstream coalescer generates a weaker electric field than the preceding upstream coalescer does.

As an alternative of using a plurality of coalescers with changing electrode arrangement or decreasing voltage, the cross section, preferably the cross sectional area, of a single centre electrode 11 is reduced in the longitudinal direction thereof, thereby reducing the field strength that the emulsion is subjected to.

The interacting pair of electrodes 5, 6 are typically copper electrodes that extend generally in parallel with or helically around the outer periphery of the tube member 1. They extend in parallel covering the same section of the tube member 1. They are either cast together with the tube member and thereby attached to the latter, or attached to the outer surface by any other suitable means, for example by gluing. They are separated with a gap or displaced in the length direction of the tube member 1 such that, thanks to the interaction of the electrodes, a suitably distributed electric field is generated in the channel 4 when a pulsed voltage or an alternating voltage is applied to the electrodes during the operation of the coalescer.

The electrodes could have a symmetric cross-section, for example circular, or have a more sheet-like design. In the embodiments of FIG. 1-6 they are sheet-like and present a curvature that corresponds to (is parallel to) the inner periphery of the respective adjacent portions of the inner periphery of the tube member 1, that is the outer periphery of the channel 4. For the extreme case of an infinite helix pitch, that is parallel electrodes extending at opposite sides of the channel 4, sheet-like electrodes that enclose a part of the channel 4, preferably a major part thereof, are preferred.

The inner diameter of the tube member 1, that is the diameter of the channel 4, is in the range of 25-1000 mm.

The distance between and the width of the electrodes, the Ditch and the voltage depends on the inner diameter.

A voltage supply supplies the first and second electrodes 5, 6 with a pulsed unipolar high voltage, i.e. pulsed DC, in the frequency range from 1-2000 Hz, preferably 10-500 Hz and most preferably 50-500 Hz. Alternatively, the voltage supply supplies the first and second electrodes with an alternating voltage, with the same frequencies as for the pulsed DC. The difference in the settling behaviour of an is oil-water emulsion in the above ranges is rather small, but especially when the first fluid is salt water the higher intervals are preferred.

It must be pointed out, however, that the optimum frequency range depends on the electrical properties of the emulsion and the tube member material, and also on the design of the tube member 1 (thickness of the insulating layer or layers).

High voltage is preferred, from 1 kV up to approximately 100 kV AC, and a higher voltage can be applied in order to compensate, but only to some extent, for non-ideal frequency.

Figure 5:
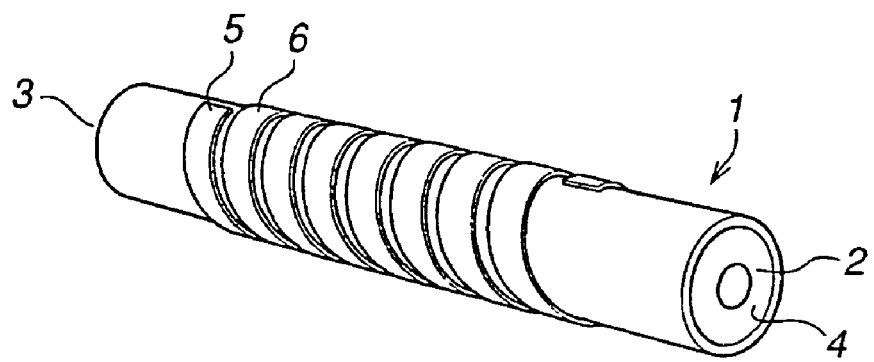
FIG. 5 is a perspective view of an embodiment of a part of the inventive device.
Figure 6:
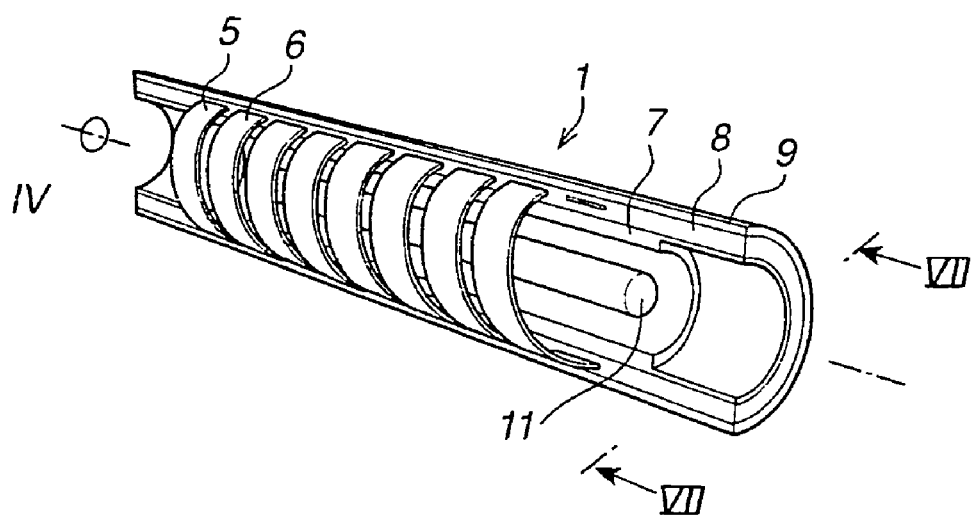
FIG. 6 is a perspective view of an alternative embodiment of the part of the inventive device shown in FIG. 5.

FIG. 5 shows an embodiment in which the first and second electrodes 5, 6 are arranged on the outer periphery of the tube member 1, while the other figures show preferred embodiments in which the first and second electrodes 5, 6 are arranged within the wall of the tube member 1. In the latter case the insulating material of the wall will counteract short circuits between the electrodes 5, 6. FIG. 6 shows an alternative embodiment of the inventive coalescer, by which the tube member comprises a plurality of individual, interconnected layers 7-9. Here, the device comprises three layers, namely an inner layer 7 adapted to be in direct contact with the emulsion of first and second fluid flowing in the flow channel 4, an intermediate layer 8 in direct contact with the electrodes 5, 6, and an outer layer 9. Preferably, at least the inner and intermediate layers are electrically insulating and able to withstand strong electric fields. At least one of the layers, preferably the outer layer, should be adapted to withstand the pressure load better than the other layers. The inner layer material should be chemically compatible with the emulsion and resistant against high electric fields. Examples of such a material are PEEK, Plexiglas or a thermoplastic. The main constituent of the intermediate layer is preferably a curable resin, such as epoxy, or a polymer composite material while the main constituent of the outer layer preferably is a polymer or a fibre- reinforced polymer or steel. The electrodes are preferably located in the intermediate layer.

It should be understood that a number of alternative embodiments of the inventive device would be obvious for a man skilled in the art without, however, going beyond the scope of the invention as delimited by the appended claims supported by the description and the drawings.

Figure 7:
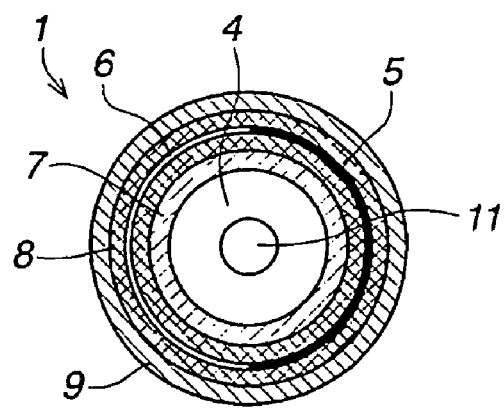
FIG. 7 is a cross-section according to VII-VII in FIG. 6.

It should be understood that the non-helical arrangement of the first and second electrodes 5, 6, as indicated in FIGS. 1-3, is an alternative way of arranging the electrodes within the scope of the invention, another possible alternative being the helical arrangement shown in FIGS. 5-7.

It should also be understood that different numbers of and different arrangement as well as geometry from the ones shown here are possible for the centre electrode, but that such alternative embodiments are all covered by the scope of the invention as defined in the appended claims.

The invention claimed is:

1. An electrically energized device for coalescing a first conductive fluid, emulsified in a second fluid, comprising:
a tube member, having at least one fluid inlet and at least one fluid outlet, said tube member being arranged in-line with a pipe or conduit and conducting an emulsion of the first and second fluid, said tube member defining a flow channel configured to receive the emulsion from its inlet side to its outlet side, said tube member comprising at least one electrically insulating wall portion, said channel having a generally circular or elliptical cross-section;
an interacting pair of a first and a second electrode extending in a longitudinal direction of the tube member, each separated from the first and second fluid by at least one insulating wall portion of the tube member, said first and second electrode configured to generate an electrostatic field across the flow channel in the first and second fluid flowing through the flow channel, the electrostatic field coalescing the first conductive fluid, said first and second electrode extend generally in parallel with or helically around the flow channel; and at least one passive center electrode extending in a longitudinal direction of the tube member, made of a conducting material, arranged in the channel and electrically insulated from the first and second electrodes, wherein the at least one passive center electrode is located between and facing the first and second electrode within said electrostatic field generated by the first and second electrode and such that the first and second fluids flow in a same direction along and between the at least one passive electrode and the at least one insulating wall portion of the tube member that insulates the first and second electrodes from the first and second fluid, and wherein the cross section of the center electrode is at least 10% of the cross section of the channel of the tube member.

2. The device according to claim 1, wherein the center electrode is grounded.

3. The device according to claim 1, wherein the center electrode is electrically insulated from earth.

4. The device according to claim 1, wherein the center electrode is elongated and generally coaxial with the channel of the tube member.

5. The device according to claim 1, wherein the cross section of the center electrode is circular or elliptic.

6. The device according to claim 1, wherein the center electrode is coated with an electrically insulating material.

7. The device according to claim 1, wherein the first and second electrode are separated with a gap.

8. The device according to claim 1, wherein the voltage applied to the first and second electrode is a pulsed or alternating voltage.

9. The device according to claim 1, wherein it is connected to a voltage supply means that supplies the first and second electrodes with a pulsed unipolar high voltage in the frequency range from 1 Hz to 2000 Hz.

10. The device according to claim 1, wherein it is connected to a voltage supply means that supplies the first and second electrodes with an alternating voltage in the frequency range from 1 Hz to 2000 Hz.

11. The device according to claim 1, wherein the first fluid is water and the second fluid is oil.

12. The device according to claim 1, wherein the cross section of the center electrode is at least 20% of the cross section of the channel of the tube member.

13. The device according to claim 1, wherein the cross section of the center electrode is at least 25% of the cross section of the channel of the tube member.

14. The device according to claim 1, wherein the first and second electrode are supplied by high voltage.

* * * * *